Dec. 13, 1955  C. R. WEBER  2,726,591
STEERING AID FOR TRACTOR-MOUNTED CULTIVATORS
Filed Oct. 24, 1952  2 Sheets-Sheet 1
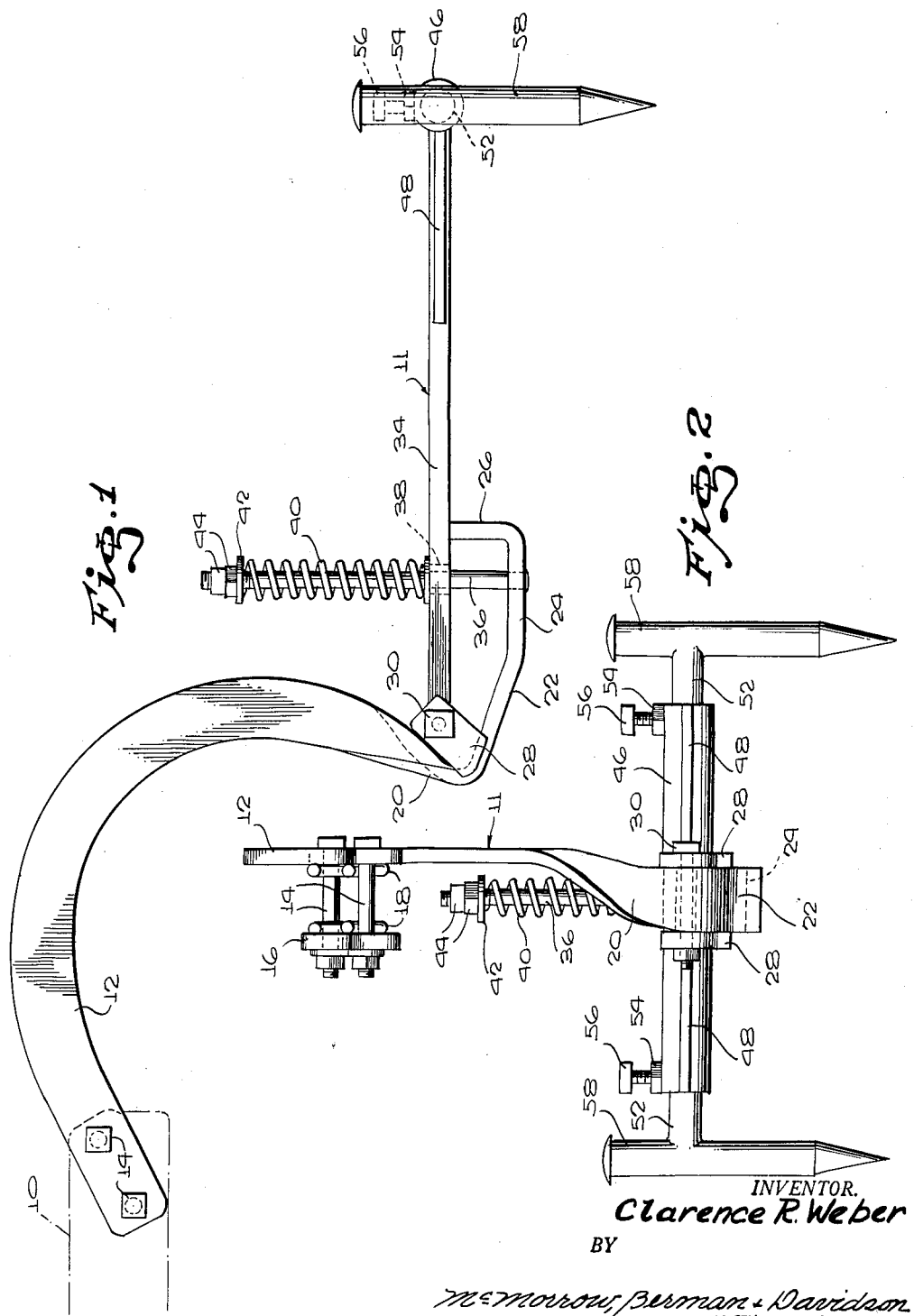
INVENTOR.
Clarence R. Weber
BY
McMorrow, Berman & Davidson
ATTORNEYS Dec. 13, 1955            C. R. WEBER            2,726,591
STEERING AID FOR TRACTOR-MOUNTED CULTIVATORS
Filed Oct. 24, 1952            2 Sheets-Sheet 2
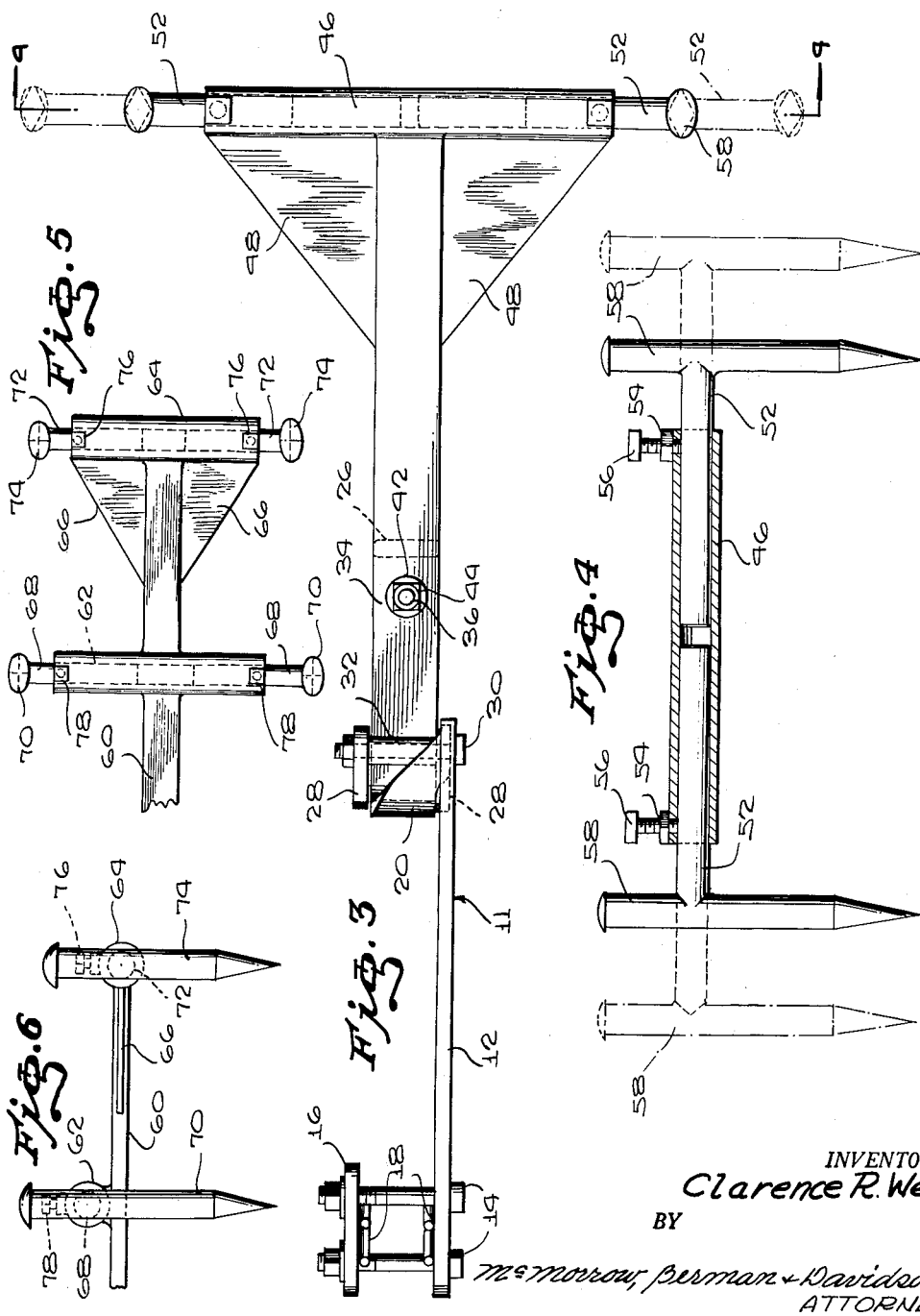
INVENTOR.
*Clarence R. Weber*
BY
*McMorrow, Berman + Davidson*
ATTORNEYS United States Patent Office 2,726,591
Patented Dec. 13, 1955

2,726,591
STEERING AID FOR TRACTOR-MOUNTED CULTIVATORS

Clarence R. Weber, Merlin, Ontario, Canada

Application October 24, 1952, Serial No. 316,625

1 Claim. (Cl. 97—56)

This invention relates to agricultural implements, and more particularly, has reference to a device adapted as a cultivator attachment, the device being so designed as to facilitate the steering of said cultivator, and of a tractor supporting the cultivator during the operation thereof.

Among the users of cultivators of the general type stated, it is well appreciated that when one is required to cultivate in the same direction more than once, hard steering of the tractor results, due to the necessity of steering the tractor along the hardened ridges formed by previous cultivation of the ground surface.

The present invention has, as one important object thereof, the facilitating of the steering, the device being so formed as to break up the ridges made by the cultivator preceding the same, to substantially level the ground.

Another object of the invention is to provide a device of the type stated which will harrow out the trench left by the cultivator blades, sweeps, duck feet, etc., thus to preserve the levelness of the ground and conserve moisture.

Still another object is to provide a device as stated which will be so designed as to be mountable upon any of various types of cultivators, whether said cultivators have round or flat shanks, or straight or curved shanks.

Still another object is to provide a steering aid as described which will be simple to install upon a cultivator, and easy to adjust after said installation.

Still another object is to provide a steering aid as described which will break up the ridge on a drill row of substantial width, the adjustable feature of the device mentioned above being such as to permit use of the device on rows spaced different distances apart.

Other objects will appear from the following description, the claim appended thereto, and from the annexed drawings, in which like reference characters designate like parts throughout the several views, and wherein:

Figure 1 is a side elevational view of a steering aid formed in accordance with the present invention, as it appears when in use;

Figure 2 is an end elevational view, taken from the left of Figure 1;

Figure 3 is a top plan view, the dotted lines showing one position to which the ground-engaging members can be selectively adjusted;

Figure 4 is a sectional view on line 4—4 of Figure 3;

Figure 5 is a fragmentary top plan view of a modified form; and

Figure 6 is a fragmentary side elevational view of the form of the invention illustrated in Figure 5.

In the drawings, the reference numeral 10 has been applied to a conventional cultivator bar, said bar being a part of a cultivator of the tractor-mounted type.

The device constituting the present invention includes a draw bar designated generally at 11, said draw bar comprising a pair of pivotally connected draw bar members. One of said members constitutes a lead draw bar member 12, said draw bar member 12 being curved longitudinally as best shown in Figure 1. At its leading end, the draw bar member 12 is provided with laterally projected clamping bolts 14 (Figure 3), said clamping bolts being extended through a clamping plate 16 spaced laterally from the draw bar member 12 and disposed in a plane parallel to that of the draw bar member. The clamp plate 16 and the draw bar member 12 are provided, in this connection, with pins 18 that facilitate the clamping of the device to a cultivator bar 10 of conventional design.

I believe that the connection provided at the front end of the lead draw bar member 12 can be varied as necessary, according to the particular cultivator on which the device is to be mounted.

Intermediate its opposite ends, the lead draw bar member is axially twisted as shown at 20, the axially twisted portion of the lead draw bar member merging into a rearwardly and downwardly inclined portion 22, said portion merging in turn into a horizontal portion 24 having, at its rear end, an upturned lip 26.

Welded to the opposite side edges of the inclined portion 22 are mounting plates 28, between which extends a pivot bolt 30, said pivot bolt passing through a spacer sleeve 32, interposed between the respective plates 28.

The pivot bolt 30 is adapted to provide a mounting for the trailing draw bar member 34, whereby said trailing draw bar member can be swung upwardly or downwardly upon its associated lead draw bar member 12.

The member 23, it should be noted at this point, cooperates with the member 12 in making up the draw bar 11.

Welded or otherwise fixedly secured at its lower end to the horizontal portion 24 of the lead draw bar member is an elongated, vertically disposed spindle 36, said spindle 36 being passed through an opening 38, the opening 38 being of substantially greater diameter than the diameter of the spindle 36 so as to permit the trailing draw bar member 34 to swing upwardly and downwardly upon the lead draw bar member.

Circumposed about the upwardly projecting part of the spindle 36 is a coil spring 40, one end of said spring abutting against a washer 42. The washer 42 is engaged against lock nuts 44, which are threaded upon the correspondingly threaded upper end of the spindle 36.

At its lower end, the spring 40 is engaged against a washer seated upon the upper surface of the trailing draw bar member 34.

It will be seen that this construction results in the trailing draw bar member 34 being yieldably but continuously urged downwardly, into engagement with the lip 26. The lip 26 thus constitutes a stop limiting downward movement of the trailing draw bar member relative to its associated lead draw bar member.

The springable mounting of the trailing draw bar member, for swinging movement in a vertical plane, is adapted to permit the device to accommodate itself to varying contours in the ground surface. In other words, the device is held in firm engagement with the ground surface, and is yet enabled to swing upwardly when necessary, should an unyielding obstruction be encountered.

The lock nuts 44, it will be noted, constitute means for adjusting the tension of the spring 40, which tension adjusting means is desirable, depending upon the characteristics of the ground surface being worked.

The spacer sleeve 32 can be integrally formed upon the adjacent end of the trailing draw bar member, or can be otherwise secured to said trailing draw bar member, to provide for the desired pivotal mounting of the member 34 upon its associated member 12.

At its free or rearwardly disposed end, the member 34 is rigidly secured to the midlength portion of an elongated sleeve or tubular member 46, gussets 48 being employed to rigidify the fixed connection between said member 46 and member 34.

The member 46 is formed open at its opposite ends, to receive stub shafts 52, said stub shafts being coaxially aligned and being individually adjustable longitudinally of the tubular member 46. In this way, the stub shafts can be adjusted toward and away from one another, laterally or transversely of the row being worked, thus to accommodate the device to the conditioning of rows of different widths, including unusually wide rows.

At their outer ends, the stub shafts 52 are fixedly secured to vertically disposed rod members 58, said rod members being pointed at their lower ends for extension thereof into the ground surface.

It is desired that means be incorporated in the invention to lock the stub shafts 52 in selected positions to which they are adjusted, and to this end, nuts 54 are welded or otherwise fixedly secured to the tubular member 46. Threadedly engaged with the nuts 54 are set screws 56, which are threadable into engagement with the stub shafts 52.

It will be seen, particularly from Figure 4, that the tubular member 46 defines oppositely projecting sockets, disposed at opposite sides of the draw bar, which sockets receive the respective shafts 52 carried on the vertically disposed rod members 58.

In the form of the invention illustrated in Figures 5 and 6, the trailing draw bar member has been designated by the reference numeral 60. The trailing draw bar member 60 is mounted upon the leading draw bar member in the same manner as the member 34 shown in the first form of the invention. The main difference in the two forms of the invention resides in the particular formation and relative arrangement of the means for mounting the rod members upon the trailing draw bar member.

As will be noted from Figures 5 and 6, there is fixedly secured to the trailing draw bar member 60 intermediate the opposite ends of said member, a tubular member 62, defining oppositely projecting sockets on the trailing draw bar member. A second tubular member 64 is parallel with and spaced rearwardly from the member 62, the tubular member 64 being welded or otherwise fixedly secured to the rear end of the trailing draw bar member 60. Gussets 66 are employed to rigidify the connection between the tubular member 64 and the trailing draw bar member 60.

Stub shafts 68 are extendable into the sockets defined by the open, opposite ends of the tubular member 62, said stub shafts being rigid, at their outer ends, with vertically disposed rod members 70.

The tubular member 64 is provided with stub shafts 72, having at their outer ends the fixedly mounted rod members 74.

Set screws 76 are mounted upon the opposite ends of the tubular member 64, to hold the stub shafts 72 in selected positions to which they are adjusted, and set screws 78 are similarly mounted upon the opposite ends of the member 62, to hold the stub shafts 68 in their selected positions of adjustment.

The form of the invention shown in Figures 5 and 6 has the same operating characteristics as the form of the invention first illustrated and described. However, the form shown in Figures 5 and 6 can be used, in many instances, to greater advantage, since it increases the number of rod members in use, and permits all of the several rod members to be adjusted relative to one another, transversely of the row being worked. This is particularly advantageous, in that it causes the hard crusts or ridges between the drill rows to be broken up effectively, by the rod members 70, 74, working singly or in cooperation with one another.

If desired, of course, the rod members 70 can be removed entirely from the device, thus to utilize only the rod members 74. Conversely, the rod members 74 can be removed, leaving only the members 70. Different agricultural conditions, will of course, govern the selection of the number of rod members, and the adjustment of the rod members to one another.

In use of the device, the structure shown is mounted upon the cultivator, and trails the cultivator sweeps, duck feet, etc. As a result, the trenches and ridges formed by the cultivator blades and by other ground-penetrating parts of the cultivator are effectively leveled out, thus to permit the tractor and cultivator to be steered with ease when the same row is worked once again, in the same direction.

Further, the breaking up of the ridges and trenches levels off and loosens the ground, thus to conserve moisture. This is particularly important in contour farming, for example.

It is also thought to be an important characteristic of the invention that the construction, whereby it levels out the trenches and ridges, permits cross cultivation to be subsequently carried out with ease, since the bumpy conditions usually experienced when cross cultivation is being carried out will be eliminated. This conserves the machinery, and leaves the ground in a level condition that facilitates appreciably combining and corn-husking.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

In a steering aid for tractors, a cultivator attachment comprising: a leading draw bar member having a front end adapted for connection to a cultivator; a trailing draw bar member pivotally connected at its front end to the leading draw bar member between the ends of said leading member, for swinging movement about a horizontal axis; a spring carried by the leading member tensioned to bias the trailing member downwardly, the leading member having a portion rearward of the pivot axis of the trailing member disposed as a stop limiting the downward movement of the trailing member; an open ended, horizontal, transverse sleeve on the rear end of the trailing member, the sleeve and the pivot axis of the trailing member being parallel and lying in a common horizontal plane in the stop engaged position of the trailing member; shafts rotatably engaged in and projecting at one end out of the respective ends of the sleeve; means on the sleeve for holding the shafts in selected positions to which they are rotated therein; and ground engaging rod members rigid with the projecting ends of the shafts extending perpendicularly to the shafts for angular adjustment of the rod members about horizontal axes defined by said shafts and extending within said plane.

References Cited in the file of this patent

UNITED STATES PATENTS

| | | |
|---|---|---|
| 807,373 | Graham | Dec. 12, 1905 |
| 982,912 | West | Jan. 31, 1911 |
| 1,202,562 | Mintern | Oct. 24, 1916 |
| 1,333,854 | Kuker | Mar. 16, 1920 |
| 2,224,051 | Ihde | Dec. 3, 1940 |
| 2,424,014 | Bobeldyk | July 15, 1947 |
| 2,561,854 | Goodspeed | July 24, 1951 |